United States Patent Office 3,111,504
Patented Nov. 19, 1963

3,111,504
PROCESS FOR THE VULCANIZATION
OF RUBBER
Friedrich Lober, Leverkusen-Bayerwerk, Ernst Roos, Cologne-Flittard, and Hans Pohle, Leverkusen, Germany, assignors to Farbenfabriken Bayer Aktiengesellschaft, Leverkusen, Germany, a corporation of Germany
No Drawing. Filed Oct. 28, 1959, Ser. No. 849,136
Claims priority, application Germany Oct. 31, 1958
4 Claims. (Cl. 260—79.5)

This invention relates to the vulcanization of rubber and to compounds useful in such a vulcanization.

The properties of a vulcanizate of natural or synthetic rubber are influenced by the nature of the vulcanizing agent as well as by other factors. When elementary sulphur is used as vulcanizing agent, it is known that ageing phenomena are observed which are attributed for example to acid formation and which deleteriously affect the properties of the vulcanizates. Such sulphur vulcanizates show a strong tendency to take up oxygen with the ageing. Consequently, an attempt has already been made to replace elementary sulphur in rubber mixtures wholly or partially by thiuram polysulphides or amine disulphides in order to improve the vulcanization properties and the ageing of such vulcanizates.

It has now been found that when vulcanizing natural or synthetic rubber, particularly good vulcanizates are obtained if the vulcanization is carried out in the presence of amine salts of polyhydrosulphuric acids which contain 7 or 8 sulphur atoms to 2 mols of the amine.

The compounds used according to the invention act as excellent vulcanizing agents and powerful accelerators, both in natural and synthetic rubber. In addition, the mechanical properties of the vulcanizates and especially the ageing thereof are substantially improved.

The polyhydrosulphuric acid amino salts used for the process of the invention can be represented by the following formula:

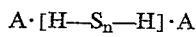

in which A represents the amines

or

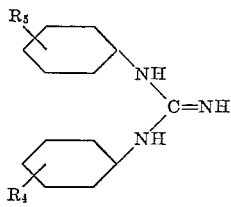

and in which formulae, $R_1$, $R_2$ and $R_3$ can each represent an alkyl, cycloalkyl or aralkyl radical which radicals may be branched and substituted e.g. by hydroxy groups, and $R_4$ and $R_5$ each can represent an alkyl radical, preferably a lower alkyl radical containing up to 5 carbon atoms, and $R_2$—$R_5$ can represent additionally a hydrogen atom. The radicals $R_1$ and $R_2$ can furthermore form a heterocyclic ring with the nitrogen atom, and this ring may contain other heterocyclic atoms, such as N, O or S atoms. $n$ is 7 or 8.

The polyhydrosulphuric acid salts of amines can for example be obtained in a simple manner if sulphur is added to an alcoholic solution of the amine and hydrogen sulphide is introduced into the suspension which is formed, preferably while stirring.

Primary, secondary and also tertiary amines are suitable for employment in the process according to the present invention, and especially those which have a dissociation constant at 25° C. which is greater than $10^{-6}$. Examples of suitable amines are diethylamine, monoethanolamine, di-N-butylamine, tert. butylamine, triethylamine, cyclohexylamine, dicyclohexylamine, N-methylcyclohexylamine, benzylamine, pyrrolidine, N-methyl pyrrolidine, piperidine, morpholine and hexamethylene imine.

Low molecular weight aliphatic alcohols, such as methyl alcohol, ethyl alcohol, isopropyl alcohol and tertiary butanol are particularly preferred alcohols to employ as solvents in the process according to the present invention. The quantity of solvent employed may be just sufficient to maintain a suspension of the reaction mixture which is just capable of being stirred. The process according to the invention is preferably carried out at room temperature or at a temperature slightly above room temperature, for example at a temperature of from 10° C. to 50° C. and preferably at a temperature of from 15° C. to 35° C. However, higher or lower temperatures can also be used. The reaction time depends on the quantity of hydrogen sulphide introduced per unit of time. The hydrogen sulphide is absorbed very quickly, so that the reaction is complete in a relatively short time. The sulphur is preferably added in a stoichiometric amount.

During the introduction of the hydrogen sulphide, the elementary sulphur enters into solution. The reaction mixture is preferably stirred during the introduction of the hydrogen sulphide. The reaction is complete when no further absorption of hydrogen sulphide takes place. The amine salts of polyhydrosulphuric acids are predominantly unitary solid compounds.

They have a yellow to orange-red colour and frequently separate out during the introduction of the hydrogen sulphide. In some cases, the reaction products are viscous oils, which frequently crystallize after standing for some time. The amine salts of polyhydrosulphuric acids are slowly split into their initial components by the action of water, and more quickly by means of acids.

The sulphur and amine contents of the amine salts can be determined by elementary analysis and/or by amine titration and are generally in the region of 7 or 8 sulphur atoms per 2 mols of amine. This sulphur content is independent of the quantity of sulphur introduced, but naturally the yield falls when the added quantity of sulphur is too low.

The process according to the present invention is illustrated by the following reaction diagram, in which diisopropylamine is the amine component.

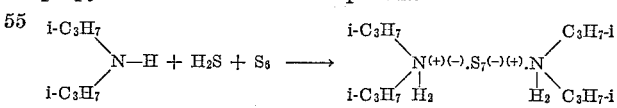

Several processes have already been described in the literature for the production of some amine salts of polyhydrosulphuric acids, but which have several disadvantages when compared with the process of the instant invention. Thus, it has been proposed to react an amine in alcoholic solution with an alkali metal polysulphide solution, to introduce air and hydrogen sulphide into an alcoholic solution of an amine, and also to react an aqueous solution of an amine salt with an ammonium or alkali metal polysulphide. These processes produce amine salts of polyhydrosulphuric acids, but only in admixture with other compounds from which it is difficult to separate the desired amine salts. By employing the aforementioned prior art processes a poor yield of amine salt is obtained in many cases. According to another process amine salts of polyhydrosulphuric acids are obtained by introducing hydrogen sulphide into a homogeneous solution of amine and sulphur. In this process dipole-free liquids, particularly benzene, are employed as solvents. This latter process, however, cannot be employed for the production of amine salts of polyhydrosulphuric acids on a commercial scale because the yield per unit volume and per unit time is too low.

In contract thereto are the polyhydrosulphuric acid amine salts according to the above mentioned preferred process for the production of these compounds obtained in a practically quantitative yield and extremely pure.

A number of the compounds suitable for the process of the invention are set out in the following table.

TABLE 1

|  |  | M.P., °C. | Properties |
|---|---|---|---|
| (1) | $[(C_2H_5)_2NH]_2 \cdot H_2S_8$ | 89–91 | Orange crystals. |
| (2) | $[(CH_3)_3CNH_2]_2 \cdot H_2S_7$ | 137–140 | Do. |
| (3) | $[(CH_3)_2CHNH_2]_2 \cdot H_2S_7$ | 137–139 | Yellow-orange crystals. |
| (4) | $[CH_3(CH_2)_3NH_2]_2 \cdot H_2S_7$ | 70–72 | Orange crystals. |
| (5) | $[(C_2H_5)_3N]_2 \cdot H_2S_7$ | 101 | Yellow-orange crystals. |
| (6) | $[CH_3(CH_2)_{11}NH_2]_2 \cdot H_2S_7$ | 100–102 | Do. |
| (7) | $[\text{cyclohexyl-}NH_2]_2 \cdot H_2S_8$ | 145–147 | Do. |
| (8) | $[\text{phenyl-}NH_2]_2 \cdot H_2S_7$ | 147 | Orange-red crystals. |
| (9) | $[\text{phenyl-}NHCH_3]_2 \cdot H_2S_7$ | — | Red viscous liquid. |
| (10) | $[\text{phenyl-}N(CH_3)_2]_2 \cdot H_2S_7$ | 73 | Orange-red crystals. |
| (11) | $[\text{pyrrolidine-}NH]_2 \cdot H_2S_7$ | — | Red viscous liquid. |
| (12) | $[\text{piperidine-}NH]_2 \cdot H_2S_7$ | 80–82 | Yellow-orange crystals. |
| (13) | $[\text{hexamethyleneimine-}NH]_2 \cdot H_2S_7$ | — | Red viscous liquid. |
| (14) | $[\text{morpholine-}NH]_2 \cdot H_2S_7$ | 90 | Yellow-orange crystals. |
| (15) | $[(\text{phenyl-}NH)_2C=NH]_2 \cdot H_2S_7$ | 115 | Do. |

The polyhydrosulphuric acid salts used according to the invention are added to the rubber mixture, generally in a quantity of from 0.5 to 15% by weight, preferably 1 to 10% by weight, calculated on the rubber content present; if necessary, in addition to the usual additives, such as for example accelerators, age-resistors or fillers. The polyhydrosulphuric acid amine salts can be used in a 100% pure form, or they may be blended with inactive or active fillers or as adsorbates on siliceous chalk, clay, silicic acids or silicates, such as zeolites, or mixed with carbon blacks. Occasionally, it is advantageous to produce the polyhydrosulphuric acid amine salts in the presence of such fillers. Furthermore, the salts can be used in the form of a paste, employing mineral oils or rubber plasticisers, or dispersed in suitable hard paraffins and then show good dispersibility and stability.

As well as natural rubber, it is also possible to use synthetic, rubber-like polymers whch can be vulcanized with sulphur and which are obtained for example by polymerisation of conjugated diolefines, such as butadiene, dimethyl butadiene, isoprene and their homologues, or the copolymers of these compounds with polymerisable vinyl compounds, such as styrene, α-methyl styrene and their substitution products, acrylonitrile, methacrylonitrile, acrylic and methacrylic acid esters and similar compounds or copolymers which are obtained from isoolefines, such as for example iso-butylene and its homologues, with relatively small quantities of conjugated diolefines. Furthermore, polymers of chlorobutadiene and its copolymers with monoolefines or diolefines or other polymerisable vinyl compounds are suitable.

EXAMPLE 1

A test mixture which contains 20.0 parts by weight of siliceous chalk
10.0 parts by weight of titanium dioxide
10.0 parts by weight of zinc oxide
1.0 part by weight of stearic acid
1.0 part by weight of tetramethyl thiuram disulphide to 100.0 parts by weight of natural rubber, is divided into 12 equal parts and one part each (A–M) is mixed with one of the following additives (the quantities relating to the rubber content). The compounds according to the invention are supplied in such quantities that the sulphur present in each sample is equal to that added in sample A.

(The numbers given in parentheses refer to the formulae of the compounds which are indicated on Table 1.)

A. 1.0% of sulphur
B. 1.7% of the piperidine salt of heptahydrosulphuric acid (12)
C. 1.9% of the hexamethylenimine salt of heptahydrosulphuric acid (13)
D. 1.9% of the cyclohexylamine salt of octahydrosulphuric acid (7)

E. 2.6% of the dicyclohexylamine salt of heptahydrosulphuric acid (8)
F. 1.7% of the diethylamine salt of octahydrosulphuric acid (1)
G. 1.9% of triethylamine salt of heptahydrosulphuric acid (5)
H. 1.6% of tert. butylamine salt of heptahydrosulphuric acid (2)
I. 2.7% of the n-dodecylamine salt of heptahydrosulphuric acid (6)
K. 1.6% of the ethanolamine salt of heptahydrosulphuric acid
L. 2.0% of the benzylamine salt of heptahydrosulphuric acid
M. 2.9% of the N,N'-diphenylguanidine salt of heptahydrosulphuric acid (15)

After vulcanization in a press, the Schopper ring test (for information see Memmler, Handbuch Kautschuk Wiss. American Edition, New York, 1934, page 529 et seq.) gives the following comparison values for the modulus at 300% elongation (the first number in each case) and the tensile strength in kg./cm.$^2$ (the second number in each case):

as powerful activators. They render possible a vulcanization with a shortened heating time and reduced temperature, and furthermore produce vulcanizates with excellent ageing properties. The amine salts of the polyhydrosulphuric acids can be obtained by the following procedure:

(a) *Dicyclohexylamine Salt of Heptahydrosulphuric Acid*

362 g. (2 mols) of dicyclohexylamine were dissolved in 900 cc. of methanol and 192 g. (6 gram atoms) of sulphur were added to the resulting solution in powder form. Hydrogen sulphide was then introduced into the suspension with stirring at 20–40° C. until no more hydrogen sulphide was absorbed (4 hours), the sulphur gradually entering into solution. The mixture became red in colour. Orange-red crystals precipitated out from the reaction mixture and were filtered with suction, washed with ether and dried in air. Yield 540 g.=92% of the theoretical, M.P. 147° C.

By reacting equivalent quantities of amine and sulphur in homogeneous solution with benzene as solvent, at least 12.5 litres of benzene and substantially longer reaction times are required.

TABLE

| Vulcanizer | A | B | C | D | E | F | G | H | I | K | L | M |
|---|---|---|---|---|---|---|---|---|---|---|---|---|
| 0.5 atm: | | | | | | | | | | | | |
| 20' | | 25-225 | 34-205 | 21-215 | 29-205 | 25-240 | | 8-80 | 17-215 | 25-225 | 5-35 | 31-200 |
| 30' | 3-25 | 26-240 | 34-210 | 23-215 | 30-210 | 26-230 | 6-60 | 21-230 | 18-210 | 24-220 | 20-200 | 32-210 |
| 45' | 7-85 | 26-230 | 33-200 | 22-215 | 30-215 | 25-215 | 22-240 | 22-240 | 16-210 | 24-210 | 30-230 | 32-205 |
| 65' | 26-175 | | | | | | 22-225 | 21-215 | | | 29-210 | |
| 2.0 atm: | | | | | | | | | | | | |
| 10' | 30-190 | | | | | | | | | | | |
| 15' | 30-215 | | | | | | | | | | | |
| 20' | 29-200 | | | | | | | | | | | |

The mixtures containing the compounds used according to the invention show a strong vulcanization at a low vulcanization temperature.

On examining the ageing after 14 days in the oxygen bomb (21 atm. gauge oxygen/60° C.) the following tensile strengths (first number) (in kg./cm.$^2$) were obtained and, after 28 days, under the same conditions the following percentage increases in weight (calculated on the rubber content (second number)):

$C_{24}H_{48}N_2S_7$ (molecular weight 588)—Calculated: C, 49.0%; H, 8.1%; N, 4.8%; S, 38.1%. Found: C, 49.1%; H, 8.2%; N, 4.6%; S, 37.1%. Calculated amine content: 61.5%. Found by titration: 60.1%.

By using other amines, it is possible in like manner to obtain the amine salts of the polyhydrosulphuric acids indicated below. Thereby it is possible to use other alcohols such as ethanol, isopropanol or tert.-butanol, also in varying amounts e.g. 400–500 cc. instead of the afore-

TABLE

| Vulcanizer | A | B | C | D | E | F | G | H | I | K | L | M |
|---|---|---|---|---|---|---|---|---|---|---|---|---|
| 0.5 atm: | | | | | | | | | | | | |
| 20' | | 190 | 185 | 175 | 180 | 175 | | | 180 | 175 | | 155 |
| 30' | | 210/0.7 | 190/0.7 | 175/0.5 | 175/0.8 | 170/1.0 | | | 190/1.0 | 180/1.3 | | 165/0.8 |
| 45' | | 200/1.0 | 190/1.0 | 160/0.8 | 165/1.0 | 140/1.5 | | | 190/1.5 | 175/1.7 | | 150/1.0 |
| 65' | 135/2.5 | | | | | | | | | | | |
| 2.0 atm: | | | | | | | | | | | | |
| 10' | 125/2.0 | | | | | | | | | | | |
| 15' | 160/3.0 | | | | | | | | | | | |
| 20' | 150/9.0 | | | | | | | | | | | |

In the present case, therefore, the compounds according to the invention are effective as sulphur donors and mentioned 900 cc. The mixture obtained should be only suitable.

| Mols Amine | Amine | Reaction Product ||||  | Calc. || Found || Summation formula |
|---|---|---|---|---|---|---|---|---|---|---|
| | | Gram-atoms sulphur | Yield | Colour | M.P. ° C. | N | S | N | S | |
| 2 | Diethylamine | 7 | 86 | y.o. | 89-91 | 6.9 | 63.3 | 6.9 | 63.5 | $C_8H_{24}N_2S_8$ |
| 2 | Triethylamine | 6 | 75 | y.o. | 101 | 6.5 | 52.3 | 6.5 | 50.8 | $C_{12}H_{32}N_2S_7$ |
| 2 | Di-n-butylamine | 6 | 91 | y.o. | 70-72 | 5.8 | 46.3 | 5.9 | 47.6 | $C_{16}H_{40}N_2S_7$ |
| 2 | Diisopropylamine | 6 | 96 | y.o. | 137-139 | 6.5 | 52.4 | 6.7 | 52.8 | $C_{12}H_{32}N_2S_7$ |
| 2 | n-Dodecylamine | 6 | 90 | y.o. | 100-102 | 4.7 | 37.6 | 4.7 | 38.0 | $C_{24}H_{56}N_2S_7$ |
| 2 | Cyclohexylamine | 7 | 82 | o.r. | 145-147 | 6.1 | 55.9 | 6.1 | 55.5 | $C_{12}H_{28}N_2S_8$ |
| 2 | Pyrrolidine | 6 | 93 | r. oil | | 7.8 | 60.7 | 7.6 | 60.6 | $C_8H_{20}N_2S_7$ |
| 2 | Piperidine | 6 | 91 | y.o. | 80-82 | 7.1 | 56.6 | 7.0 | 55.0 | $C_{10}H_{24}N_2S_7$ |
| 2 | Hexamethylenimine | 6 | 92 | r. oil | | 6.6 | 52.8 | 6.4 | 53.0 | $C_{12}H_{28}N_2S_7$ |
| 2 | Morpholine | 6 | 87 | y | 89-91 | 7.0 | 56.0 | 6.8 | 56.8 | $C_8H_{20}O_2N_2S_7$ |
| 2 | N-Dimethylcyclohexylamine | 6 | 80 | o.r. | 73-75 | 5.8 | 46.5 | 5.4 | 46.1 | $C_{16}H_{36}N_2S_7$ |
| 2 | N,N'-Diphenylguanidine | 6 | 71 | y.o. | 115 | 12.95 | 35.2 | 12.48 | 36.2 | $C_{26}H_{28}N_6S_7$ |
| 2 | Ethanolamine | 6 | 93 | y | 99-102 | 8.1 | 64.5 | 8.1 | 66.7 | $C_4H_{16}O_2N_2S_7$ |
| 2 | Benzylamine | 6 | 83 | y | 109-110 | 6.31 | 51.0 | 6.1 | 53.2 | $C_{14}H_{20}N_2S_7$ |
| 2 | N,N'-Di-o-tolylguanidine | 6 | 80 | y | 156-159 | 11.9 | 31.9 | 11.9 | 32.8 | $C_{30}H_{36}N_6S_7$ |

NOTE.—y=yellow. y.o.=yellow-orange. o.r.=orange-red. r. oil=red oil.

EXAMPLE 2

A test mixture which contains 100.0 parts by weight smoked sheets
30.0 parts by weight EPC-black
10.0 parts by weight MAF-black
6.0 parts by weight zinc oxide
3.0 parts by weight stearic acid is divided into three equal parts and one part each is mixed with one of the following additives. The quantities relate to the rubber content. No sulphur and no vulcanization accelerator is added.

A. 4.9% by weight of the di-isopropylamine salt of heptahydrosulphuric acid
B. 3.7% by weight of piperidine of heptahydrosulphuric acid
C. 6.8% by weight of the di-o-tolylguanidine salt of heptahydrosulphuric acid After vulcanization in the press the Schopper ring test gives the following comparison values (the first number gives the modulus at 300% elongation, and the second number gives the tensile strength in kg./cm.$^2$):

| Vulcanizer | A | B | C |
|---|---|---|---|
| 1.0 atm: 25' | 15–90 | 23–135 | 14–100 |
| 2.5 atm: | | | |
| 35' | 63–200 | 67–215 | 62–220 |
| 50' | 75–220 | 80–240 | 65–230 |
| 70' | 85–225 | 88–235 | 65–220 |

EXAMPLE 3

A test mixture which contains 20.0 parts by weight of SRF carbon black,
4.0 parts by weight of magnesia and
15.0 parts by weight of zinc oxide per 100.0 parts by weight of chlorobutadiene polymer is divided into four equal parts and each part has added thereto one of the following additives, based on the polymer content:

A. 1.65% by weight of the dicyclohexylamine salt of heptahydrosulphuric acid,
B. 1.65% by weight of the cyclohexylamine salt of octahydrosulphuric acid,
C. 1.65% by weight of the dodecylamine salt of heptahydrosulphuric acid,
D. without additive (for comparison purposes).

After vulcanization in the press, the Schopper ring test carried out under the same conditions as in Example 1, produces the following comparison values (the first number gives the modulus at 300% elongation and the second number gives the tensile strength in kg./cm.$^2$):

| Vulcanizer | A | B | C | D |
|---|---|---|---|---|
| 0.5 atm: 20' | 7–65 | 8–70 | 12–75 | 6–20 |
| 4.0 atm: | | | | |
| 8' | 19–160 | 19–160 | 15–150 | 6–50 |
| 15' | 30–185 | 30–175 | 24–170 | 14–130 |
| 25' | 35–190 | 40–180 | 29–175 | 15–150 |

EXAMPLE 4

A test mixture which contains 100.0 parts by weight butadiene-styrol-copolymer
44.0 parts by weight HAF-black
5.0 parts by weight zinc oxide
5.0 parts by weight mineral oil softener
1.5 parts by weight stearic acid
0.8 part by weight paraffin wax
1.0 part by weight wool fat
1.6 parts by weight benzothiazyl-2-dicyclohexylsulfenamide
1.0 part by weight phenyl-α-naphthylamine is divided into seven equal parts and one part each is mixed with one of the following additives, respectively additive mixtures. The quantities relate to the rubber content, whereby the compounds used according to the invention are supplied in a higher dosage according to their higher molecular weight (compared with the sulphur):

A. 2.0% by weight sulphur
B. 2.6% by weight of the dicylohexylamine salt of heptahydrosulphuric acid (8), 1.0% by weight sulphur
C. 5.2% by weight of the dicyclohexylamine salt of heptahydrosulphuric acid (8)
D. 1.9% by weight of the diisopropylamine of heptahydrosulphuric acid (3), 1.0% by weight of sulphur
E. 3.8% by weight of the diisopropylamine salt of heptahydrosulphuric acid (3)
F. 1.7% by weight of the piperidine salt of heptahydrosulphuric acid (12), and 1% by weight of sulphur
G. 3.4% by weight of the piperidine salt of heptahydrosulphuric acid (12).

After vulcanization in the press the Schopper ring test gives the following comparison values, whereby the first number indicates the modulus at 300% elongation and the second number the tensile strength in kg./cm.$^2$:

| Vulcanizer | A | B | C | D | E | F | G |
|---|---|---|---|---|---|---|---|
| 0.5 atm: | | | | | | | |
| 20' | | 4–5 | 12–45 | 6–15 | 27–110 | 8–20 | 47–120 |
| 60' | | 9–20 | 45–160 | 63–190 | 64–210 | 87–200 | 110–205 |
| 3.0 atm: | | | | | | | |
| 20' | | 65–180 | 74–185 | 100–210 | 84–195 | 110–195 | 125–200 |
| 30' | | 8–50 | 88–200 | 83–195 | 110–195 | 92–205 | 120–185 | 130–190 |
| 60' | 55–200 | | | | | | |

EXAMPLE 5

A test mixture which contains 100.0 parts by weight of butadiene-acrylonitrile-copolymer
44.0 parts by weight of HAF-black
5.0 parts by weight of zinc oxide
5.0 parts by weight of methylene-bis-thioglycolic acid-butyl ester
1.5 parts by weight of stearic acid
0.8 part by weight of paraffin wax
1.6 parts by weight of benzothiazyl-2-dicyclohexylsulfenamide
1.0 part by weight of phenyl-α-naphthylamine is divided into seven equal parts and one part each is mixed with one of the following additives, respectively with one of the additive mixtures. The quantities relate to the rubber content. The compounds according to the invention are added in such amount that the sulphur content of the additives, respectively additive mixtures corresponds to those cases in which only sulphur is added:

A. 2.0% by weight sulphur
B. 2.6% by weight of the dicyclohexylamine salt of heptahydrosulphuric acid (8), 1.0% by weight sulphur.
C. 5.2% by weight of the dicyclohexylamine salt of heptahydrosulphuric acid (8)
D. 1.9% by weight of the diisopropylamine salt of heptahydrosulphuric acid (3), 1.0% by weight sulphur
E. 3.8% by weight of the diisopropylamine salt of heptahydrosulphuric acid (3)
F. 1.7% by weight of the piperidine salt of heptahydrosulphuric acid (12), and 1% by weight of sulphur
G. 3.4% by weight of the piperidine salt of heptahydrosulphuric acid (12).

After vulcanization in the press the Schopper ring test gives the following comparison values (the first number in each case gives the modulus at 300% elongation and the second number the tensile strength in kg./cm.$^2$:

| Vulcanizer | A | B | C | D | E | F | G |
|---|---|---|---|---|---|---|---|
| 0.5 atm: | | | | | | | |
| 10' | | | 5-5 | 5-5 | 8-10 | 5-5 | 23-60 | 8-15 |
| 40' | 10-30 | 56-150 | 38-120 | 56-150 | 40-120 | 115-210 | 74-145 |
| 1.5 atm: | | | | | | | |
| 20' | 30-185 | 86-185 | 66-185 | 84-190 | 71-190 | 117-180 | 108-195 |
| 30' | 46-215 | 105-215 | 88-210 | 108-205 | 91-210 | 145-185 | 135-190 |
| 60' | 63-210 | | | | | | |

EXAMPLE 6

A paste of zinc oxide and of the zinc salt of diethyl-dithiocarbamic acid with a 5% solution of the sodium salt of methylene-bis-naphthalenesulfonic acid is added to rubber latex (rubber content 66.5%). The resulting mixture contains 2.5% by weight zinc oxide and 1.0% by weight of the zinc salt of the diethyl-dithiocarbamate, relating to the dry rubber content.

This mixture is divided into seven equal parts and one part each is mixed with one of the following additives which have been pasted in the corresponding manner (the quantities relate to the rubber content):

A. Without additive
B. 1.0% by weight sulphur
C. 1.5% by weight of the diphenylguanidine of heptahydrosulphuric acid (15), 0.5% by weight sulphur
D. 2.9% by weight of the diphenylguanidine salt of heptahydrosulphuric acid (15)
E. 2.6% by weight of the dicyclohexylamine salt of heptahydrosulphuric acid (8)
F. 1.9% by weight of the diisopropylamine salt of heptahydrosulphuric acid (3)
G. 1.9% by weight of the cyclohexylamine salt of octahydrosulphuric acid (7).

Into this paste mixture there are dived test tubes with a diameter of 30 mm. The films formed on the test tubes are dried and vulcanized at about 100° C. The lower part of this film is removed from the test tubes, and the remaining pipe like film is rolled from the lower part to the upper part, thus forming a rubber ring having a diameter of about 1 mm. With this rubber ring the Schopper ring test is carried through whereby the following comparison values were obtained. (The numbers indicate the tensile strength in kg./cm.$^2$.)

| Vulcanizer | A | B | C | D | E | F | G |
|---|---|---|---|---|---|---|---|
| 100° C.: | | | | | | | |
| 10' | | | 420 | 415 | 390 | | 420 |
| 20' | 175 | 375 | 430 | 460 | 420 | 390 | 420 |
| 35' | 175 | 415 | 430 | 485 | 410 | 415 | 400 |
| 50' | 160 | 410 | | | 430 | | |

EXAMPLE 7

A test mixture containing 100.0 parts by weight of isobutylene-isoprene-polymer
40.0 parts by weight of HAF-black
5.0 parts by weight of zinc oxide
2.0 parts by weight of stearic acid is mixed in a kneader at a temperature of 175–180° C., thereafter it is divided into 3 equal parts, and one part each is mixed on a roller with one of the following additives (the quantities relate to the polymer content):

A. 3.2% of the ethanolamine salt of heptahydrosulphuric acid, 1% thiuramdisulfide and 0.5% mercaptobenzothiazole, each part separately being added,
B. 3.9% of the diisopropylamine salt of heptahydrosulphuric acid and 1% thiuramdisulfide, and 0.5% mercaptobenzothiazole, separately being added,
C. 3.5% of the piperidine salt of heptahydrosulphuric acid, and 1.0% thiuramdisulfide and 0.5% mercaptobenzothiazole, separately being added.

After vulcanization in a press the Schopper ring test gives the following comparison values (the first number give the modulus at 300% elongation, the second number in each case indicates the tensile strength in kg./cm.$^2$):

| Vulcanizer | A | B | C |
|---|---|---|---|
| 1.0 atm: 10' | 13-125 | 15-130 | 17-130 |
| 4.0 atm: | | | |
| 25' | 38-160 | 30-170 | 45-165 |
| 45' | 48-165 | 42-165 | 65-160 |

We claim:
1. In a process for the vulcanization of a member selected from the group consisting of natural rubber and a sulfur-vulcanizable diene rubber, the improvement which comprises employing as vulcanization agents amine salts of polyhydrosulfuric acids which contain a member selected from the group consisting of 7 and 8 sulfur atoms to 2 mols of the amine.
2. The process of claim 1 wherein said amine salt is the cyclohexylamine salt of octahydrosulfuric acid.
3. The process of claim 1 wherein the amine salt is the dicyclohexylamine salt of heptahydrosulfuric acid.
4. The process of claim 1 wherein the amine salt is the diisopropylamine salt of heptahydrosulfuric acid.

References Cited in the file of this patent
UNITED STATES PATENTS 2,468,159  Barton _____ Apr. 26, 1949
2,819,254  Tann _____ Jan. 7, 1958

OTHER REFERENCES

Krebs et al.: Z. ahorg. u. allgem. Chem. 275, pages 147–51 (1954).
Chem. Abstracts, 49, pages 15, 726, November 25, 1955.